United States Patent

Krebs et al.

[11] Patent Number: 6,072,310
[45] Date of Patent: Jun. 6, 2000

[54] METHOD AND DEVICE FOR DETECTING AND CORRECTING A SATURATED CURRENT PROFILE OF A CURRENT TRANSFORMER

[75] Inventors: Rainer Krebs; Anil Kumar; Jörg Ammon, all of Erlangen, Germany

[73] Assignee: Siemens Aktiengesellschaft, Munich, Germany

[21] Appl. No.: 09/090,561

[22] Filed: Jun. 4, 1998

[30] Foreign Application Priority Data

Jun. 4, 1997 [DE] Germany .......................... 197 23 422

[51] Int. Cl.[7] .................................................. G01R 33/00
[52] U.S. Cl. .................................. 324/117 R; 324/117 R; 324/127
[58] Field of Search .............................. 324/117 R, 127, 324/117 H, 141, 142, 244, 96; 330/8; 336/175

[56] References Cited

FOREIGN PATENT DOCUMENTS

| 0 090 095 | 10/1983 | European Pat. Off. . |
| 93/13581 | 8/1993 | European Pat. Off. ........... 324/117 R |
| 39 38 254 A1 | 5/1991 | Germany . |

OTHER PUBLICATIONS

International Application WO 93/13581 (Bjoerklund et al.), dated Jul. 8, 1993, Reconstruction of saturated current transformer signals.

*Primary Examiner*—Christine K. Oda
*Assistant Examiner*—Anthony Jolly
*Attorney, Agent, or Firm*—Herbert L. Lerner; Laurence A. Greenberg; Werner H. Stemer

[57] ABSTRACT

A method and a device for detecting and correcting a saturated current profile of a current transformer in a particularly simple and reliable way, initially uses a number of logic inquiries derived from sampled values of the present current signal profile to detect a start of saturation on the basis of a pattern recognition. An end of saturation is subsequently determined, likewise with the aid of a number of logic inquiries. A saturation signal is then formed from a combination of the logic inquiries. In the case of the detection of saturation, the current sampled values are discarded, and an image of the unsaturated current signal profile is reconstructed from a number of sampled values determined ahead of the time of detection of saturation.

8 Claims, 3 Drawing Sheets

METHOD AND DEVICE FOR DETECTING AND CORRECTING A SATURATED CURRENT PROFILE OF A CURRENT TRANSFORMER

BACKGROUND OF THE INVENTION

Field of the Invention

The invention relates to a method for detecting and correcting a saturated current profile of a current transformer, in particular for a medium-voltage or high-voltage system, with the aid of a pattern characteristic of a saturated current signal profile. The invention also relates to a device for carrying out the method.

In order to ensure the operation of a power supply system, a system disturbance, for example due to a short circuit, must be detected and located. Protection equipment or protective devices used for that purpose operate not only particularly quickly, but also selectively, so that the disturbance site is located by the protective device and only the disturbed item of apparatus is switched off. It follows therefrom that accurate knowledge of the response characteristic of a measuring transducer or current transformer assigned to the protective device is of particular importance for a correctly operating system protection. Since, in addition, in such a power supply system the primary current can be more than 100 A, in particular more than 400 A, in undisturbed operation, and can be more than 10 kA, in particular more than 40 kA, in the case of a short circuit, there is furthermore normally a need for a particularly large dynamic operating range of the measuring transducer or current transformer. However, the dynamic operating range is limited by the nonlinear magnetic coupling, due to core saturation occurring, between a primary winding and a secondary winding of the current transformer, with the result that in the case of a saturated current transformer the secondary current only partially represents an image of the primary current. That can lead to malfunctions of the protective device.

Consequently, current transformers with an anti-remanence air gap are frequently used at the highest-voltage level, or the current transformers that are used are overdimensioned in such a way that they are able themselves to transmit a fully asymmetrical short-circuit current in a non-saturated manner. However, the use of such an overdimensioned current transformer is particularly cost intensive and thus, for medium-voltage and high-voltage systems in particular, it is exceptionally uneconomical.

A more cost effective possibility is developing algorithms for calculating back from the saturated current profile to the unsaturated current profile of the current transformer. However, calculating accurately back to the saturated current is particularly intensive in terms of computer time. Thus, for example, International Patent Publication WO 93/13581 has disclosed a numerical method for reconstructing saturated transformer current signals in which a saturation and the end thereof of a secondary current measured in a time-discrete manner are determined with the aid of a transformer model for the unsaturated and the saturated transformer current as well as a model for the primary current.

Published European Patent Application 0 090 095 A1 has disclosed an evaluation method for the secondary current of a current transformer switched into a line of a power supply system on the primary side, in which a saturation signal is generated with the aid of a pattern characteristic of a saturated current signal profile. For that purpose, a Fourier analysis is performed on system-external frequencies, and a comparison between the filtered and the unfiltered secondary current is used to detect the saturation thereof. A comparatively quick detection of transformer saturation is achieved through the use of the method described in German Published, Non-Prosecuted Patent Application DE 39 38 154 A1, in which a possible deviation from the characteristic current waveform is detected by forming the space vector of the secondary transformer currents in the case of a blocked fundamental negative-sequence component.

SUMMARY OF THE INVENTION

It is accordingly an object of the invention to provide a particularly simple method and a device for detecting and subsequently correcting a saturated current profile of a current transformer, which overcome the hereinafore-mentioned disadvantages of the heretofore-known methods and devices of this general type.

With the foregoing and other objects in view there is provided, in accordance with the invention, a method for detecting and correcting a saturated current profile of a current transformer with the aid of a pattern characteristic of a saturated current signal profile, the method which comprises determining a start of saturation and an associated end of saturation from a number of logic inquiries derived from sampled values of a current signal profile, detecting the start of saturation by interrogating sampled values in a signal range for determining a signal gradient, and detecting the end of saturation by interrogating sampled values in a signal range complementary to the start of saturation for determining the signal gradient; and generating an image of the unsaturated current signal profile from a number of non-saturated sampled values for saturation Correction.

In this case, the first step is to use a number of logic inquiries derived from sampled values of the present current signal profile to detect the start of saturation or beginning of saturation on the basis of a pattern recognition. The end of saturation is subsequently determined, likewise with the aid of a number of logic inquiries, with the signal gradient being determined for the purpose of detecting the start of saturation and the end of saturation in complementary signal ranges. A saturation signal is then formed from a combination of the logic inquiries. In the case of the detection of saturation, the current sampled values are discarded, and an image of the unsaturated current signal profile is reconstructed from a number of sampled values determined ahead of the time of detection of saturation.

The invention proceeds in this case from the consideration that, on one hand, original current values that are unsaturated in normal operation or sampled values of the current signal profile are to be passed on for further processing. On the other hand, the original values are to be replaced by approximated values only if a saturation is actually present. With respect to the detection of saturation, this is performed in a particularly simple and reliable way with the aid of pattern recognition of a typical saturation profile.

With respect to the reconstruction of the unsaturated current signal profile, the invention is based on the finding that it is possible on the basis of the so-called least square theorem to dispense with the exponential component thereof and that only the fundamental component in accordance with the relationship:

$$i(t) = c_c \cos(\omega t) + c_c \sin(\omega t) + c_0$$

is to be considered for generating an image of the unsaturated current signal profile. A complete reconstruction of the unsaturated current signal profile is therefore not required. Rather, it is possible by using the fundamental component alone to generate a sufficiently good or accurate image of the unsaturated current signal profile. This holds, in particular, when only a few interpolation points or sample values are available.

All that need be fulfilled as an interrogation condition for detecting the beginning of saturation is that on one hand a signal characterizing the secondary current profile is non-saturated in the case of a first sampled value and that, on the other hand, a negative gradient is present in the case of a positive area of the signal. In this case, the saturation signal is assigned, for example, a positive value, preferably the value "1". Similarly, on the basis of the complementary behavior of the half waves of a sinusoidal signal the negative area is assigned a positive gradient as criterion for the beginning of saturation, with the result that the saturation signal is assigned an inverted or negative value, for example the value "-1". If none of the above criteria is fulfilled, no saturation is present, and the value "0" is preferably assigned to the saturation signal.

In accordance with another mode of the invention, the absolute value of the determined gradient is expediently compared with a reference value weighted with a gradient factor. It is thereby advantageously possible to set the sensitivity of detection of the start of saturation by controlling the gradient factor, which specifies the ratio between the determined gradient and the reference gradient. In this case, the gradient factor is set between a first limiting value representing an overreaction or an undesired sensitivity, and a second limiting value representing nondetection of a saturation.

For the purpose of detecting the end of saturation, in addition to the criterion of the presence of a start of saturation, it is expedient to use the current value and the gradient of one of the subsequent complementary half waves as further criteria. A determination is made with reference to the current value as to whether or not the latter is above twice the amplitude of the nominal current.

Setting up the criteria for detecting the end of saturation proceeds from the finding that when detecting a start of saturation in accordance with a specific and always at least approximately the same pattern in the respectively complementary signal region, a steep partial curve follows on a flat partial curve. Consequently, if saturation has been determined for a positive area, such a flat curve segment with a shallow negative gradient is sought in the negative area. If such a curve portion is present, the detection of the steep curve portion is released. The steep curve portion must then be located in the negative area, and the gradient must be negative. Moreover, the absolute value of the gradient should have a specific ratio in comparison with the reference value.

In accordance with a further mode of the invention, it is possible to use as a further criterion the fact that the corresponding gradient must occur in the case of a curve portion having an absolute value at this point which is above twice the amplitude of the nominal current. If such a curve portion has been found, an end of saturation is detected. An analogous statement holds in the case of saturation in the negative area. In this case, as well, the absolute value of the gradient is compared with the reference value weighted with a further gradient factor.

With the objects of the invention in view there is also provided a device for detecting and correcting a saturated current profile of a current transformer with the aid of a pattern characteristic of a saturated current signal profile, the device comprising an analog-digital converter connected downstream of a current transformer for generating sampled values of an actual current signal profile; and an evaluation device connected downstream of the analog-digital converter, the evaluation device having a saturation detector and a adaptive filter for determining an approximated current signal profile with the aid of the sampled values, and the evaluation device operating according to the method and containing an algorithm for generating an unsaturated current signal profile and an approximated current signal profile for detecting saturation, and for generating a saturation signal from the sampled values of the actual current signal profile.

The advantages achieved by the invention are, in particular, that it is possible to reliably distinguish between a saturated and an unsaturated current signal profile by generating a saturation signal on the basis of a pattern recognition while detecting only a start of saturation and an associated end of saturation. As a result, it can be determined in a simple and reliable way at which instants the current signal profile is to be reconstructed. Likewise, the instant is determined from which filtered approximation is no longer to be performed. The detection and correction of saturation can therefore be carried out reliably by using an algorithm which is particularly effective in terms of computer time.

Other features which are considered as characteristic for the invention are set forth in the appended claims.

Although the invention is illustrated and described herein as embodied in a method and a device for detecting and correcting a saturated current profile of a current transformer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
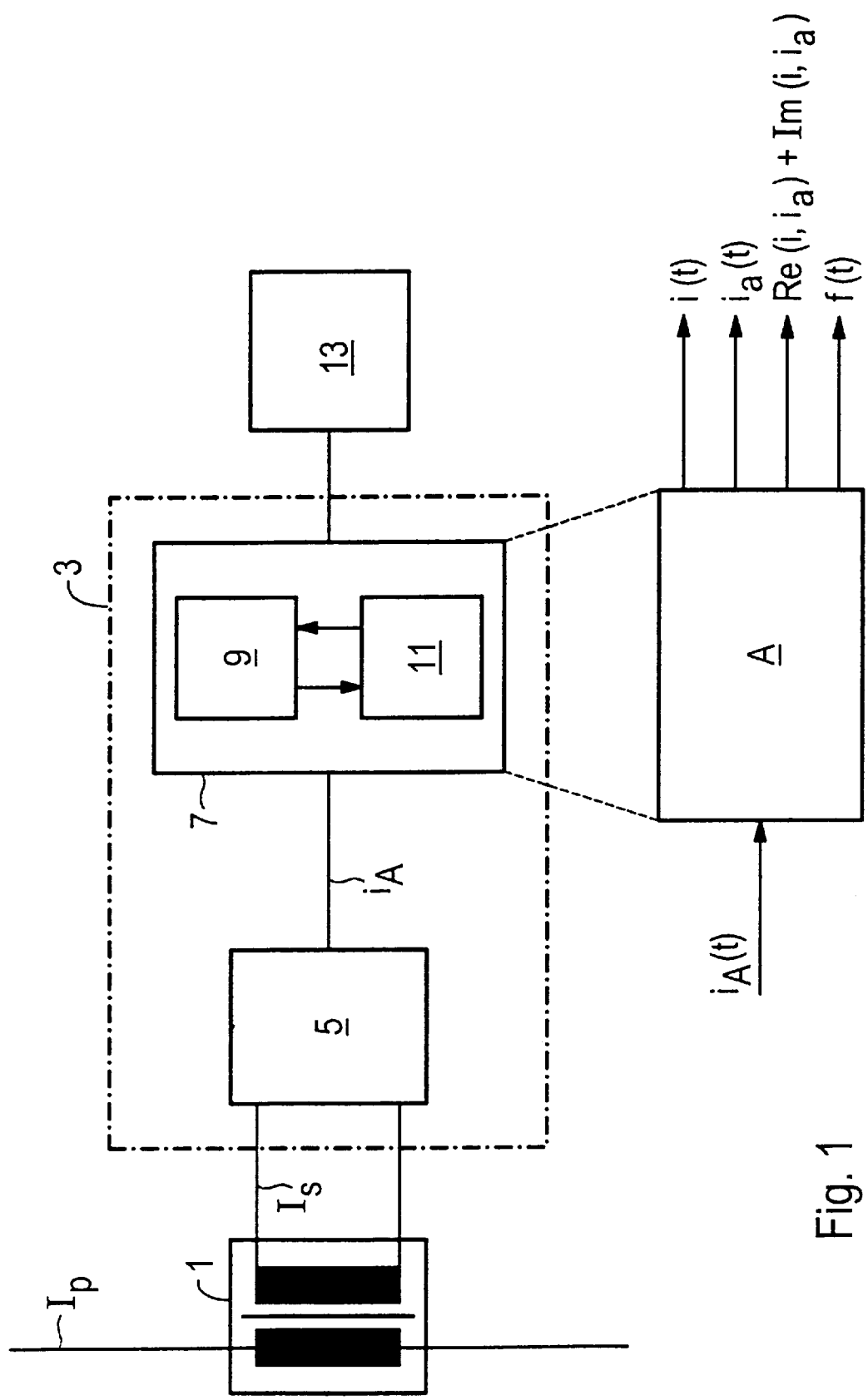
FIG. 1 is a schematic and block diagram of a current transformer with a downstream device for detecting saturation and correcting saturation.

Referring now to the figures of the drawings in detail and first, particularly, to FIG. 1 thereof, there is seen a current transformer 1 which, by transformation, converts a primary current $I_p$ of a power supply system into a comparatively lower secondary current $I_s$ through the use of a specific transformation ratio. Given an idealization of such a current transformer or transformer 1, the so-called knee-point voltage can be used as a criterion for subdividing the saturation behavior of the transformer 1 into an unsaturated and a saturated region. In this case, the knee-point voltage represents that point on the magnetization curve of the transformer 1 at which an increase of ten percent in the voltage effects an increase of fifty percent in the magnetization current. The primary current $I_p$ transformed on the secondary side of transformer 1 then no longer flows through the actual load, but instead through the principal inductance of the transformer 1. The consequence is the collapse of the secondary current $I_s$, which then only occasionally represents an exact image of the primary current $I_p$. In the case of closed-core transformers, it is possible to generate a characteristic which fits at least in terms of order of magnitude from knowledge of the principle of the profile of some transformer characteristics from which it is possible on average to draw an unsaturated principal inductance $L_h$ on the order of magnitude of 400 Henry, as well as from knowledge of the knee-point voltage $U_k$ and an associated magnetization current $I_M$.

Figure 3:
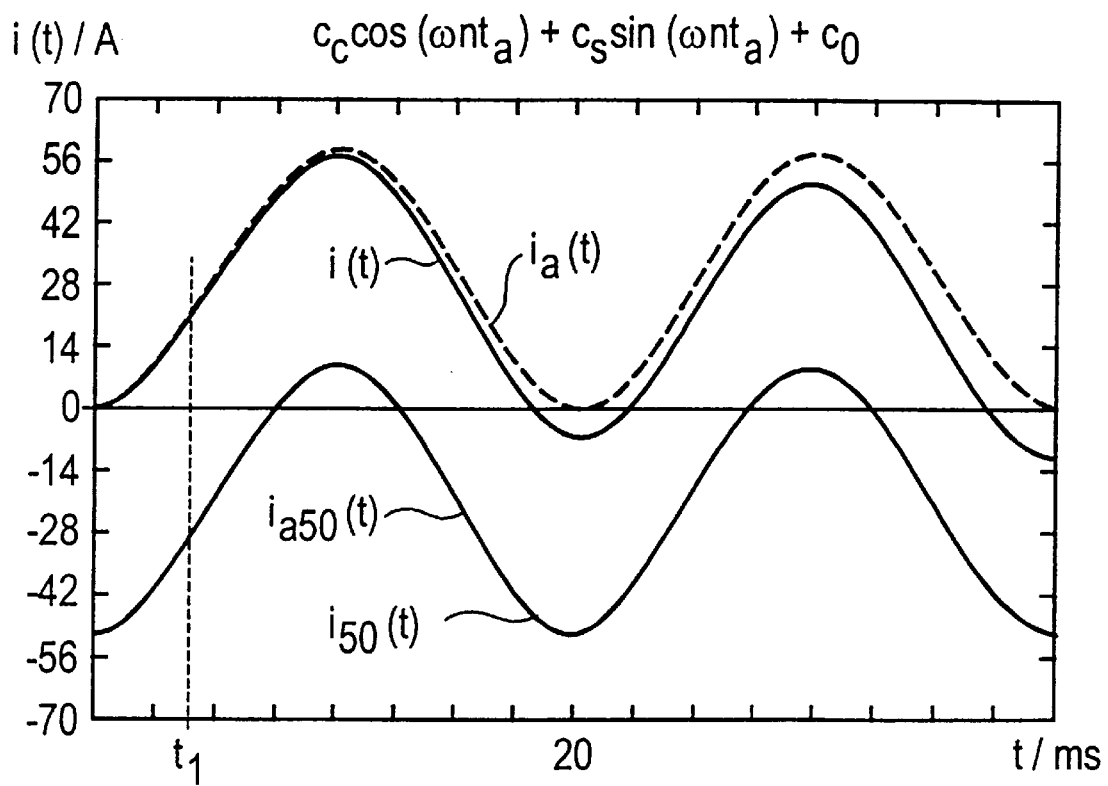
FIG. 3 is a graph of signal profiles for the purpose of correcting saturation.

A device 3 for detecting and correcting saturation is provided for the purpose of detecting a saturation of the transformer 1 on one hand, and of reconstructing an unsaturated current profile or current signal profile i(t) upon the occurrence of a saturation current $i_s$ on the other hand. The device includes an analog/digital converter 5 downstream of the transformer 1, and an evaluation device 7 with a saturation detector 9 and an adaptive filter 11 for determining an image of the unsaturated current signal profile i(t), as is seen in FIG. 3. A filter or relay module 13 which, for example, has a filter algorithm for further processing the data supplied by the evaluation device 7, is connected downstream of the device 3.

During operation of the transformer 1, the analog/digital converter 5 supplies a number of sampled values $i_A$ of the secondary current $I_s$ as interpolation points, with the aid of which saturation is detected in the evaluation device 7, on one hand, and the unsaturated current signal or current signal profile i(t) is reconstructed when saturation has been detected. An algorithm A stored (or marked) in the device 7 generates the actual current signal profile i(t) as output data for an unsaturated transformer 1, as well as an approximated current signal profile $i_a(t)$ and a saturation signal f(t) in the case of a detection of saturation, that is to say a saturated transformer 1. Moreover, the respective real and imaginary parts Re(i(t), $i_a(t)$) and Im(i(t), $i_a(t)$) of the current signal i, $i_s$ are generated for a vectorial evaluation.

Figure 2:
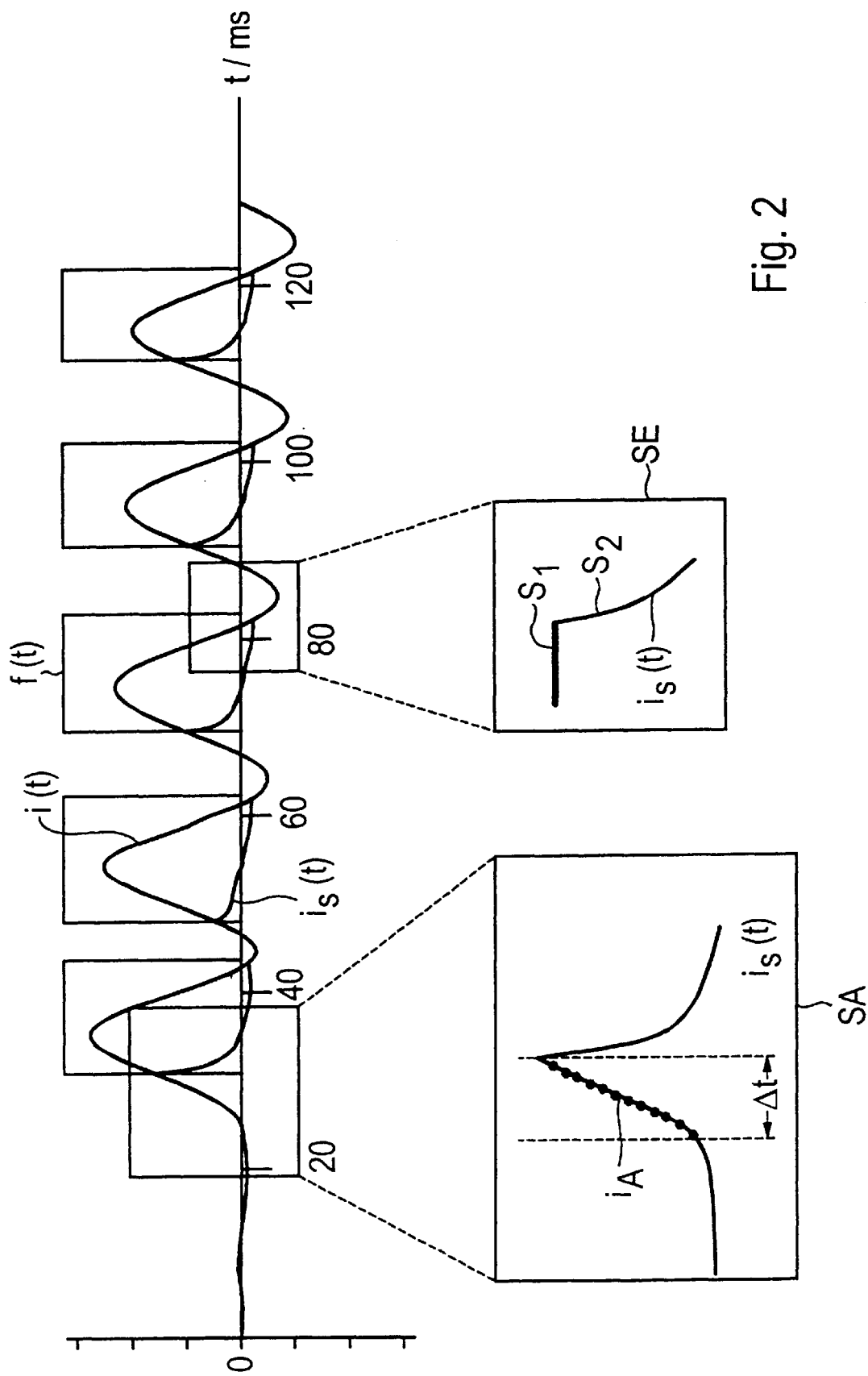
FIG. 2 is an illustration of a method of functioning of a saturation detector.

The method of functioning of the device 3 for detecting saturation and correcting saturation follows from the representation according to FIG. 2. The aim of the method is to pass on unsaturated original current sampled values $i_A$ unchanged to the module 13 for as long as possible and to replace the sampled values $i_A$ by approximated values $i_a$ only in the case of an actually present saturation. The detection of saturation is performed through the use of the saturation detector 9 with the aid of pattern recognition of a typical saturation current profile $i_s(t)$. Only a beginning of saturation or start of saturation SA and an associated end of saturation SE are detected. The corresponding signal ranges of the start of saturation SA and the end of saturation SE are indicated in FIG. 2 on a larger scale.

Only a few logic inquiries are advantageously required in order to recognize and detect both the start of saturation SA and the end of saturation SE. The saturated current signal $i_s$ is normalized in FIG. 2 with respect to the primary current $I_p$ represented by an unsaturated current signal i. A saturation signal f(t) supplied by the saturation detector 9 is zero (f(t)=0) if no saturated current signal profile $i_s(t)$ is present. The saturation signal f(t) is one (f(t)=1) if a saturated current signal profile $i_s(t)$ is present on a positive area. It is minus one (f(t)=−1) if saturation occurs on a negative area.

The saturation signal f(t) is formed by simple logic combinations, in which the latter behaves in a complementary manner for the positive and the negative areas. Consequently, more detail will be given below only regarding the conditions for saturation in the case of the positive area. In the case of the positive area, saturation is detected when the difference between two sampled values $i_A$ is negative. As further criteria, it is possible to use the fact that the absolute value of a gradient Δi is greater than the product of a gradient factor K and a stored reference value $\Delta i_{max}$, and that the current signal i(t) was non-saturated one sampled value $i_A$ earlier. The absolute value of a maximum difference $\Delta i_{max}$, occurring in a corresponding signal section, between two sampled values $i_A(t), i_A(t-\Delta t)$ detected at different times is stored, for the purpose of determining the reference value $\Delta i_{max}$, during a reference measurement using an unsaturated transformer 1, for example.

The sensitivity of the detection of the start of saturation SA can be set in a simple way by varying the reference value $\Delta i_{max}$ by controlling the gradient factor K=|Δi|/$\Delta i_{max}$. The correction factor K is expediently smaller than two (K<2) and, depending on the sampling frequency (1 kHz or 4 kHz) and the signal section, is between K=0.001 and K=1.8. The gradient factor is preferably K=0.6.

Thus, a start of saturation SA is reliably detected in the case of a positive area if the gradient Δi is negative (Δi<0), if the absolute value of the gradient |Δi| is greater than the reference value $\Delta i_{max}$ (|Δi|>K*$\Delta i_{max}$) weighted with the correction factor K, and if at least one earlier sampled value $i_A$ was non-saturated, and thus at an instant t−Δt the saturation signal was f(t−Δt)=0. In this case, the saturation signal f(t)=1 at the instant t.

Similarly, a start of saturation SA is reliably detected in the case of a negative area if the gradient Δi is positive (Δi>0), if the absolute value of the gradient |Δi| is, again, greater than the reference value $\Delta i_{max}$ weighted with the correction factor K is (|Δi|>K*$\Delta i_{max}$), and if at least one earlier sampled value $i_A$ was, again, non-saturated (f(t−Δt)= 0). In this case, the saturation signal is f(t)=−1. Therefore, the relationship: Δi(t)=i(t)−i(t−Δt) holds in each case.

The detection of the end of saturation SE is likewise carried out through the use of a few logic inquiries, with the result that an end of saturation SE is also certainly detected in the case of an occurrence of a start of saturation SA. As the enlarged right-hand excerpt of FIG. 2 shows, it is understood that the end of saturation SE is likewise distinguished by a characteristic pattern with a steep partial curve $S_2$, drawn with a thin line, which is preceded by a flat partial curve $S_1$, drawn with a thick line. The detection of whether the course of the curve is steep or flat is performed by comparing the gradient Δi in the negative area with a reference value $\Delta i_{max}$. If saturation was detected in the positive area, such a flat partial curve $S_1$ is initially determined in the negative area.

The criteria for detecting the flat partial curve $S_1$ are that the saturation signal f(t) is equal to ore (f(t)=1), that both the current signal i(t) and the gradient Δi are negative (i(t)<0, Δi<0), and that the ratio of the absolute value of the gradient Δi, even of two successive sampled values $i_A$, to the reference value $\Delta i_{max}$, smaller than a gradient factor K', where, for example, K'=0.4, is (|Δi(t)| and |Δi(t−Δt)|<0.4*$\Delta i_{max}$).

In the case of the presence of such a flat curve portion or partial curve $S_1$, a release is made upon the detection of the following steep partial curve $S_2$. In the case of saturation in the positive area, the partial curve is therefore located in the negative area. Conversely, in the case of saturation in the negative area the steep curve portion $S_2$ is located in the positive area. The gradient Δi is used again as the condition of the inquiry. Moreover, it is expedient to make use as a further criterion of the fact that the absolute value, represented by the respective sampled values $i_A$ of the current signal $i_s$ is greater at the corresponding point inside the current profile i(t) than twice the amplitude of the nominal current. If such partial curves $S_1$, $S_2$ have been determined, the end of saturation SE is detected. ($|\Delta i(t)|>K^*\Delta i_{max}$ and $|i(t)|>2\times2\square I_n$ then hold as further conditions for the release, with $I_n$ specifying the amplitude of the nominal current.

A gradient factor K=0.6 was determined empirically for the ratio $|\Delta i|/\Delta i_{max}$. In the case of a system constant $T_n$=100 ms with the gradient factor K, the end of saturation SE is detected after the end of the third period since the start of short circuiting in the case of a purely asymmetrical primary current $I_p$, with the result that approximation is performed over three periods during the saturation correction initiated thereupon. It is even possible through the use of a suitable reduction of the saturation factor K to already detect the first end of saturation SE, which occurs after approximately 15 ms in this example.

The unsaturated current signal profile i(t) is reconstructed for the purpose of correcting the saturated current signal profile $i_s(t)$. On the basis of the so-called least square theorem, having an exponential component that expediently remains out of consideration, the fundamental component of the current signal i(t) is taken into account in accordance with the relationship i(t)=$c_c$ cos ($\omega$t)+$c_s$ sin($\omega$t)+$c_0$. A complete reconstruction of the unsaturated current signal profile i(t) is thus not required. Rather, a sufficiently good image of the unsaturated current signal profile can be generated by using the fundamental component alone. This is particularly advantageous in the case, in particular, of only a few available interpolation points or sampled values $i_A$.

FIG. 3 shows the current signal profile $i_a(t)$ reconstructed in accordance with the theorem, in which the unsaturated current signal profile i(t) represents the variable to be approximated. If the approximation is started, for example at $t_1$=4 ms, sixteen interpolation points (sampled values $i_A$) are available for the algorithm A of the adaptive filter 11 in the case of a sampling frequency of 4 kHz. The current signal profile $i_a(t)$ is the profile of the current signal i approximated over two periods. A current signal profile $i_{50}(t)$ is an actual fundamental component of this current signal i, while $i_{a50}(t)$ represents an approximated fundamental component.

Starting from a minimum window width of the adaptive filter 11 which depends on the duration of an unsaturated transmission of the transformer 1 given the appearance of, for example, a short circuit, the adaptive filter builds up following the start of the algorithm A as far as the full period. If a disturbance then occurs, for example in the form of a short circuit, the filter window of the adaptive filter 11 is initially reduced to the minimum window width, since at least one sampled value $i_A$ is more than twice the nominal current. Thereupon, it builds up anew. If saturation then occurs, all of the sampled values $i_A$ located in the filter window, with the exception of at least the last sampled value $i_A$, are used as interpolation points for the approximation (FIG. 2).

Through masking out at least the last sampled value $i_A$, it is ensured that the latter does not already belong to the saturated current signal profile $i_s(t)$. After detection of the end of saturation SE, it is still possible to continue approximating until the filter window of the adaptive filter 11 has built up anew to minimum width with sampled values $i_A$ of the unsaturated current signal profile i(t). Once this is achieved, the algorithm A switches over anew to normal filtering. Thereupon, the filter window is built up anew until either a renewed saturated current signal profile $i_s(t)$ occurs, or until the state of the full period filter is reached.

The approximation of the current signal profile $i_a(t)$, $i_{a50}(t)$ requires only three sampled values $i_A$, and thus only three interpolation points by virtue of the approach used in the algorithm A. It follows from this that the transformer 1 must transmit only during a time interval of 0.75 ms given a sampling frequency of 4 kHz, and only over a period of 3 ms given a sampling frequency of 1 kHz.

We claim:

1. A method for detecting and correcting a saturated current profile of a current transformer with the aid of a pattern characteristic of a saturated current signal profile, the method which comprises:

determining a start of saturation and an associated end of saturation from a number of logic inquiries derived from sampled values of a current signal profile, detecting the start of saturation by interrogating sampled values in a signal range for determining a signal gradient, and detecting the end of saturation by interrogating sampled values in a signal range complementary to the start of saturation for determining the signal gradient; and generating an image of the unsaturated current signal profile from a number of non-saturated sampled values for saturation correction.

2. The method according to claim 1, which comprises comparing the absolute value of the gradient with a reference value weighted with a settable gradient factor.

3. The method according to claim 2, which comprises setting the gradient factor K between K=0.001 and K=2.

4. The method according to claim 1, which comprises forming a saturation signal which given an unsaturated current signal profile is zero, given a saturated current signal profile on a positive area is one, and given saturation on a negative area is minus one.

5. The method according to claim 1, which comprises detecting the start of saturation in the case of a positive area if the gradient is negative, if the absolute value of the gradient is greater than a reference value, and if at least one earlier sampled value was non-saturated.

6. The method according to claim 1, which comprises detecting the start of saturation in the case of a negative area if the gradient is positive, if the absolute value of the gradient is greater than a reference value, and if at least one earlier sampled value was non-saturated.

7. The method according to claim 1, which comprises detecting the end of saturation by using an additional criterion that the absolute value of the current signal is greater than twice the amplitude of the nominal current.

8. A device for detecting and correcting a saturated current profile of a current transformer with the aid of a pattern characteristic of a saturated current signal profile, the device comprising:

an analog-digital converter connected downstream of a current transformer for generating sampled values of an actual current signal profile; and an evaluation device connected downstream of said analog-digital converter, said evaluation device having a saturation detector and a adaptive filter for determining an approximated current signal profile with the aid of the sampled values, and said evaluation device containing an algorithm for generating an unsaturated current signal profile and an approximated current signal profile for detecting saturation, and for generating a saturation signal from the sampled values of the actual current signal profile.

* * * * *